United States Patent Office 2,970,581
Patented Feb. 7, 1961

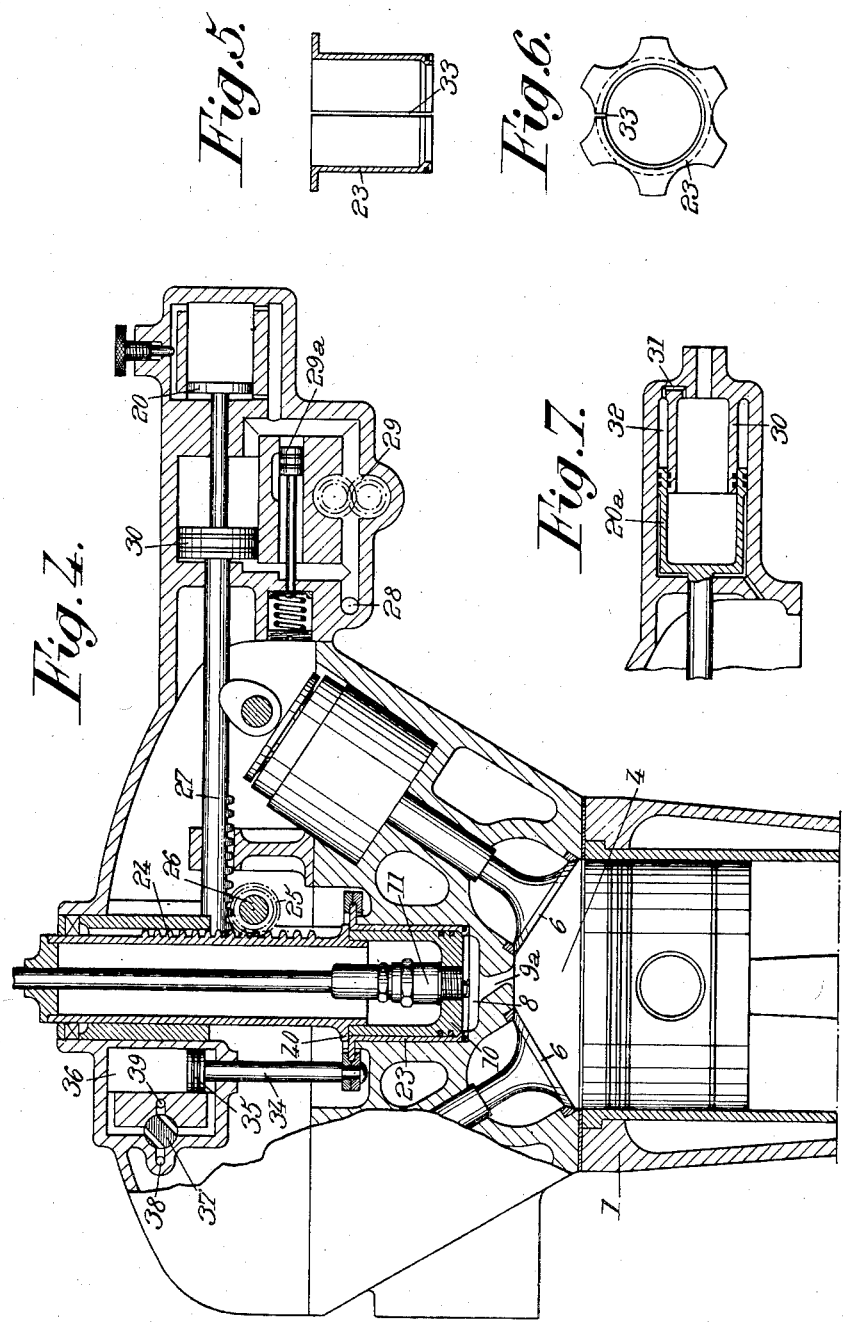

2,970,581
INTERNAL COMBUSTION ENGINES THE COMPRESSION RATIO OF WHICH IS ADJUSTABLE IN OPERATION

Raymond Georges, 67 Ave. Foch, Paris, France

Filed Nov. 12, 1958, Ser. No. 773,498

Claims priority, application France Nov. 15, 1957

4 Claims. (Cl. 123—48)

The present invention relates to internal combustion engines the compression ratio of which can be adjusted in operation. It is more particularly concerned either with engines intended to work with different fuels or with engines provided with a supercharger which will be brought into or out of action in accordance with the conditions of operation of the engine.

The chief object of my invention is to provide an internal combustion engine of this kind which is better adapted to meet the requirements of practice than those known at the present time.

The engine includes at least one cylinder the main combustion chamber of which is limited by the corresponding piston end and the inner wall of the cylinder head carried by said cylinder. According to my invention, there is provided in said cylinder head at least one secondary combustion chamber opening into said main combustion chamber and in which is engaged, in an adjustable position, a plunger element the displacements of which serve to modify the volume of the secondary combustion chamber and therefore the ratio of compression of the engine. Preferably, the means for igniting the fuel mixture present in the two combustion chambers are located in the secondary combustion chamber.

Preferred embodiments of the present invention will be hereinafter described with reference to the accompanying drawings, given merely by way of example and in which:

Fig. 1 of these drawings is an elevational view, with parts in axial section, of the upper portion of an internal combustion engine made according to the present invention, this engine being fed with a fuel mixture.

Figs. 3 and 4 are views similar to Fig. 1 showing two modifications thereof.

Figs. 5 and 6 show, respectively in axial section and in plan view, a sleeve having a reciprocating motion intended to be housed in the secondary combustion chamber of an engine as shown by Fig. 4.

Fig. 7 shows, in axial section, a modification of a damping device to be incorporated in such an engine.

Figure 1:
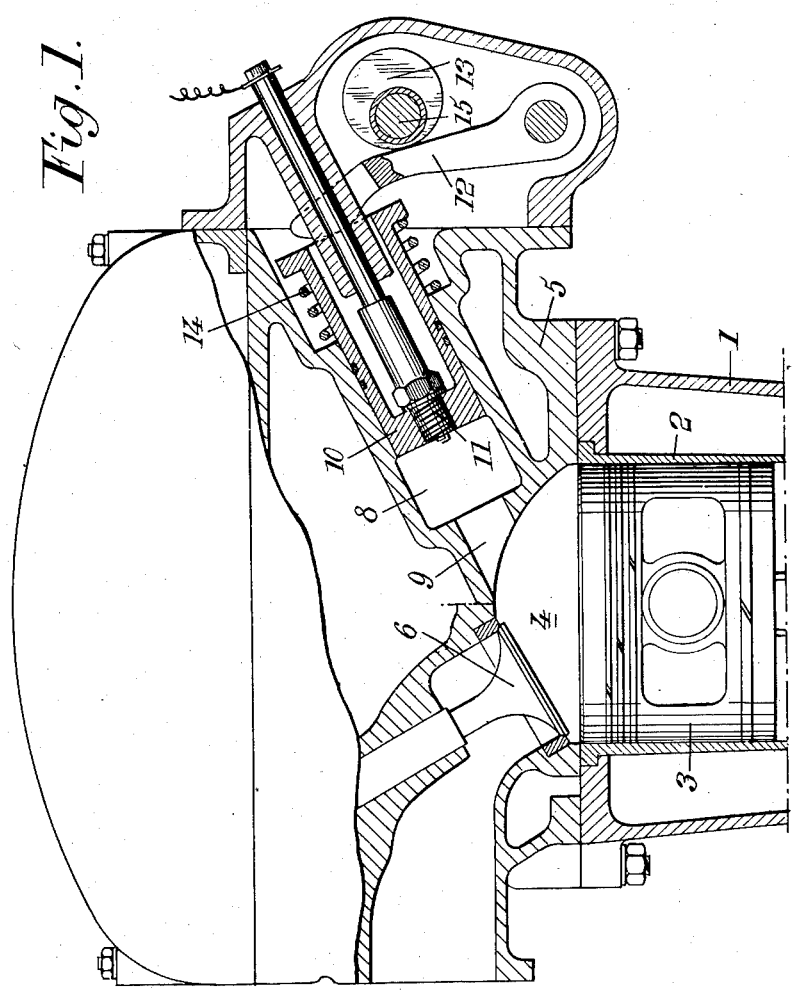
Figure 2:
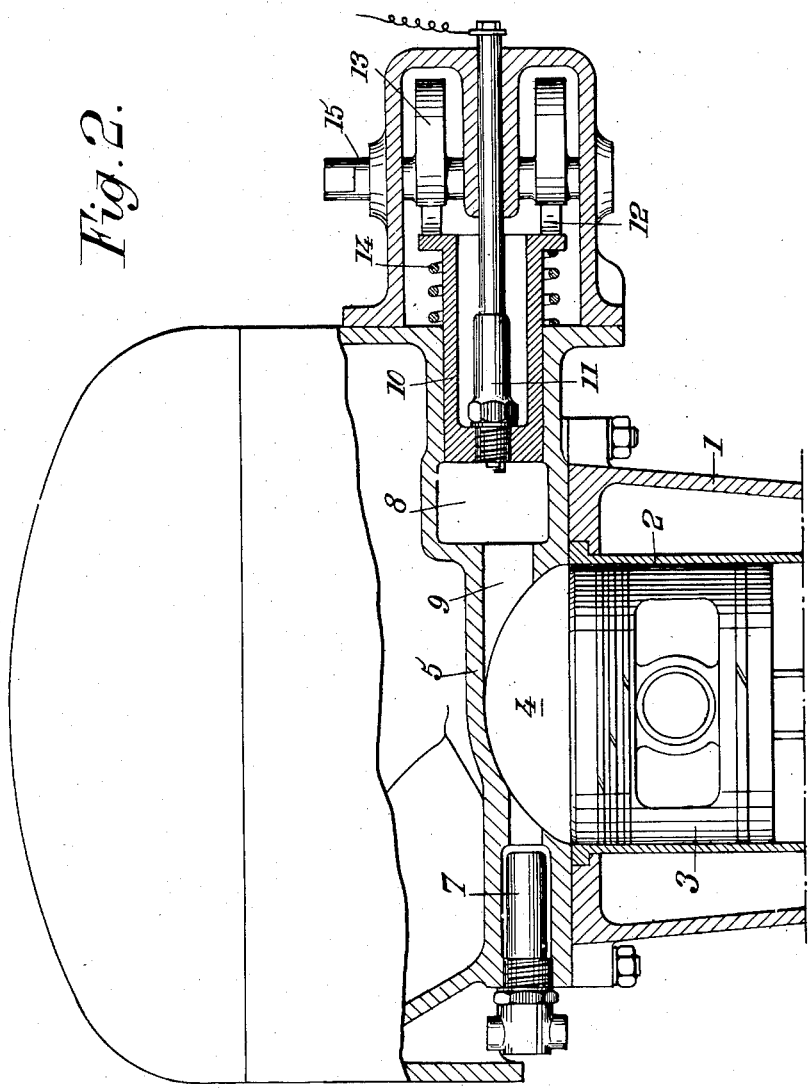
Fig. 2 is a similar view corresponding to the case of a direct fuel injection engine.
Figure 3:
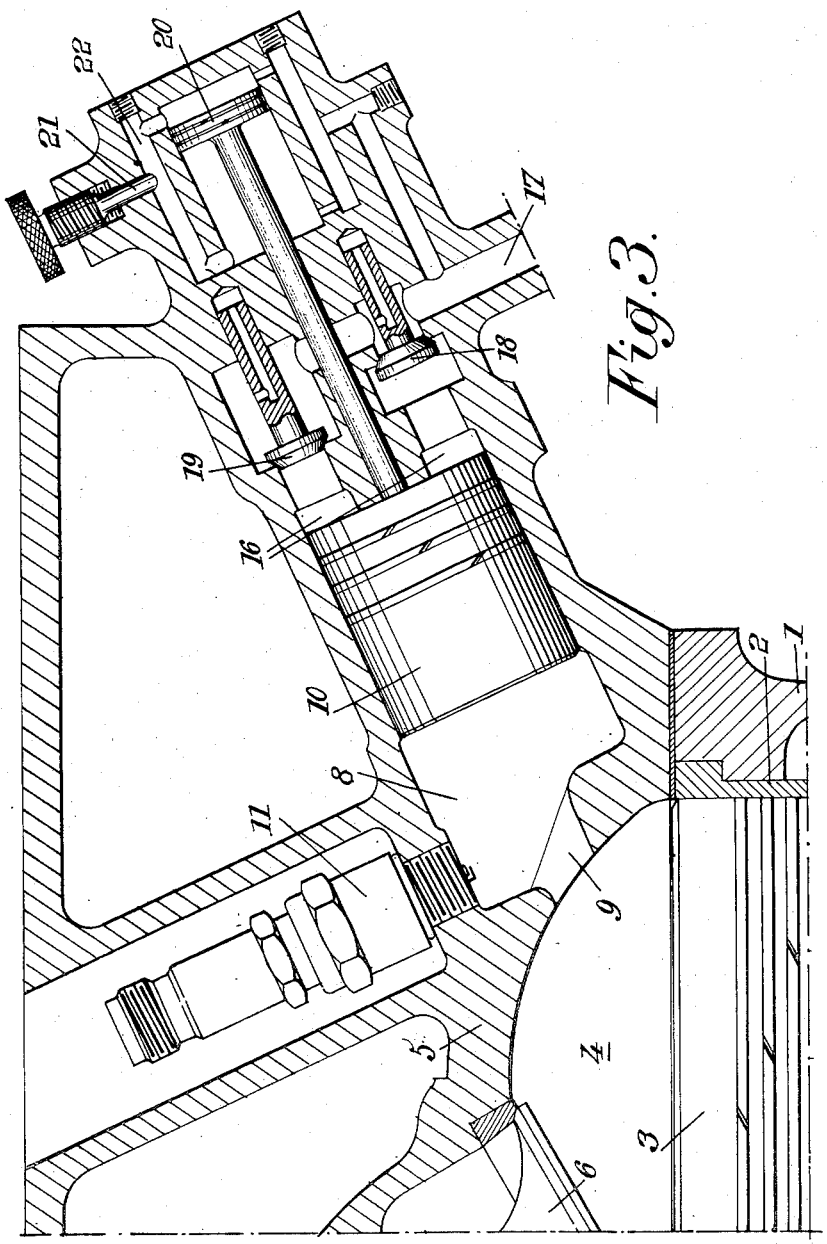

The internal combustion engine shown by Figs. 1 to 3 includes a cylinder 1 the inner wall 2 of which cooperates with a piston 3, the main combustion chamber 4 of the engine being limited by the top face of piston 3 and by the inner wall of a cylinder head 5 secured on cylinder 1. This cylinder head advantageously carries the valve means (fuel mixture inlet valve 6 in the case of Figs. 1 and 3 and fuel injector 7 in the case of Fig. 2) and the ignition means.

The means for varying in operation the compression ratio of such an engine are, according to the present invention, made as follows:

There is provided, in cylinder head 5, at least one secondary combustion chamber 8 which is preferably, and as it will be hereinafter supposed, of cylindrical shape and which opens into the main combustion chamber 4, advantageously through a passage 9 of of a cross-section smaller than that of said secondary combustion chamber 8.

In this secondary chamber 8 there is provided a plunger, such as a piston 10, adapted to be engaged more or less deeply in said chamber, the displacements of said piston modifying the volume of the secondary combustion chamber and therefore varying the compression ratio of the engine.

The secondary combustion chamber 8 preferably contains the ignition means intended to produce explosion of the gaseous mixture present in the two combustion chambers (main chamber 4 and secondary chamber 8). Said ignition means may be constituted by a conventional spark plug 11 mounted either in piston 10 (case of Figs. 1 and 2), or in a portion of the wall of secondary chamber 8 which is never to be covered by piston 10.

It should be noted that, when the engine is of the direct fuel injection type (case of Fig. 2), the secondary combustion chamber 8 is preferably located opposite injector 7 so as to enable the fuel to penetrate straight into said chamber 8.

In the constructions illustrated by Figs. 1 and 2, the device for controlling piston 10 is operated from the outside of the cylinder head, and said device is constituted by a lever 12 bearing against the outer end of piston 10 and subjected to the action of a cam 13 which produces, through said lever 12, the displacement of piston 10 in secondary chamber 8, preferably against the action of return means consisting for instance of a spring 14.

If the shaft 15 on which cam 13 is mounted is located on the outside of cylinder head 5, it is possible to modify the compression ratio of the engine in operation merely by rotating shaft 15 through the angle necessary to produce the variation of volume of secondary chamber 8 which corresponds to the obtainment of the desired compression ratio.

Rotation of shaft 15 may be effected by means of a manually operable control member (for instance a lever fixed on said shaft).

I may also, according to the present invention, vary the position of piston 10 in accordance with the maximum pressure existing in the combustion chambers 4 and 8 in such manner that the variations of the compression ratio due to the displacements of piston 10 (which variations range for instance from 5 to 7.5) automatically maintain the maximum pressure $p$ in said combustion chambers to a substantially constant value suitable for a good operation of the engine.

It should be noted that variations of the maximum pressure $p$ may result for instance from a variation of the supercharging rate, or from a variation of the octane number of the fuel, or from a variation of the load of the engine.

In order to obtain automatic regulation of pressure $p$, it is advantageous to make use of the construction illustrated by Fig. 3.

Piston 10 is slidable in the cylindrical bore in which it is fitted.

This piston is subjected to the action of means tending to push it toward the inside of the secondary compression chamber. For this purpose, I may make use of suitable springs. However, preferably, I subject the rear face of the piston to the action of a fluid, for instance oil, at an adjustable high pressure, capable of exerting on said rear face a force equal to that exerted on the front face of the piston by the gases of the combustion chambers when said gases are at the maximum admissible pressure $p_1$, the working chamber 16 for the fluid under pressure being in communication with a feed conduit 17 with the interposition of an inlet valve 18 and of a discharge valve 19.

Piston 10 is connected with a damping device, such for instance as a hydraulic dash-pot 20, so as to prevent pulsating displacements of said piston 10 during the cyclical variations of the pressure in the combustion chambers 4 and 8.

Preferably, said damping device is provided with adjusting means which may be constituted for instance by an adjustable member 21 projecting into the conduit 22 which connects the two respective chambers of dashpot 20, so as more or less to throttle said conduit 21.

The operation of such a self-regulating device is as follows:

When the maximum pressure $p$ in chamber 8 is equal to the maximum admissible pressure $p_1$, piston 10 is balanced in a mean position; when pressure $p$ is lower than $p_1$, the action of the liquid on piston 10 becomes perponderating, inlet valve 18 opens and piston 10 moves in the direction corresponding to an increase of the compression ratio, which has for its effect to increase the maximum pressure. On the contrary, when pressure $p$ is higher than pressure $p_1$, the action of the gases on piston 10 becomes preponderating, discharge valve 19 opens and piston 10 moves in the direction corresponding to a reduction of the compression ratio, which has for its effect to lower the maximum pressure and to restore the balance between the two faces of piston 10.

It results from this operation that the automatic variations of the compression ratio (within a range compatible with an acceptable efficiency of the engine, for instance from 5 to 7.5) ensure a stabilization of the maximum pressure produced in the combustion chamber 8 at a value which can be adjusted by acting upon the pressure of the liquid arriving through conduit 17.

In the embodiments above described, the plunger piston 10 slides directly in a cylinder forming an extension of the secondary combustion chamber 8. In some cases, in particular when the plunger piston has remained for a long time in the same position, it may be stuck in this position, due to the depositing of substances from the combustion gases.

As shown by Fig. 4, this risk is avoided by interposing, between piston 10 and the cylinder in which it is movable, a sleeve 23 having a reciprocating motion, preferably uninterrupted during the periods of operation of the engine.

This sleeve 23 thus produces a sweeping of the corresponding surfaces of piston 10 and of the cylinder in which it moves, the length of this sleeve and the amplitude of its reciprocating motion being preferably determined in such manner that this sweeping action extends over the whole of said surfaces whatever be the position occupied by piston 10.

On the other hand, the reciprocating sleeve 23 facilitates lubrication of the corresponding surfaces of piston 10 and of its cylinder.

The reciprocating movement of sleeve 23 may be relatively slow, for instance corresponding to one or some periods per second, so that the means for controlling said sleeve may be constituted by parts which are both simple and of light weight.

The means for reciprocating sleeve 23 may be of the mechanical type, but it seems preferable to make use of electric and, preferably, hydraulic control means. Electric and hydraulic devices permit a more easy obtainment of a movement of variable amplitude of sleeve 23 in accordance with the position of piston 10.

For instance, if sleeve 23 is of a length substantially equal to that of piston 10, it is possible to obtain a sweeping of the whole of the surfaces of the piston and of its cylinder by giving said sleeve a reciprocating movement of an amplitude corresponding to the distance between the end of piston 10 and the extreme position that can be occupied by this end for the position of said piston in which it is fully engaged into its cylinder.

Fig. 4 illustrates a construction in which piston 10 has its position automatically adjusted as a function of the maximum pressure existing in combustion chambers 4 and 8.

In this construction, the engine cylinder head is provided with two overhead valves 6 disposed symmetrically and the secondary chamber 8 is provided in said cylinder head along the axis of the main combustion chamber 4, the communication between said secondary and main chambers taking place through oblique nozzles 9a ensuring a very satisfactory atomizing of the small fuel drops in suspension in the gaseous mixture.

Piston 10 carries, integral therewith, a rack 24 in mesh with a pinion 25 fixed on a shaft 26 extending along the row of cylinders. This shaft 26 further carries still another pinion cooperating with a control rack 27 urged by a resilient device in the direction tending to drive piston 10 into its cylinder. This resilient device is of the hydraulic type and comprises for instance a liquid feed conduit 28, a pump 29 followed by a pressure regulating slide valve 29a, a power piston 30 and a damping device. This damping device includes a solid piston 20 (case of Fig. 4) or an annular piston 20a cooperating with a guiding sleeve 30 the inner chamber of which communicates, through a calibrated conduit 31, with annular chamber 32 swept by said piston 20a (case of Fig. 7).

As for sleeve 23, it is advantageously made, as shown by Figs. 5 and 6, so as to have some radial resiliency, for instance by providing it with a slot 33, either straight or inclined, so that said sleeve need not be provided with packing rings.

This sleeve 23 is hydraulically controlled by connecting it, through rods 34 (the number of which is for instance three), to respective pistons 35 each movable in a cylinder 36 which may be placed in communication, through a rotary valve 37, alternately with conduit 38, in communication with a source of oil under pressure and with a discharge conduit 39.

With such a hydraulic control, sleeve 23 has a reciprocating movement limited downwardly by a shoulder provided on the cylindrical wall of auxiliary chamber 8 near the bottom thereof and upwardly by an abutment 40 carried by piston 10 at the top end thereof, the amplitude of the stroke of said sleeve 23 being the greater as the piston 10 occupies a position farther from the combustion chamber (the nearest position is shown on Fig. 4 where this amplitude is zero).

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An internal combustion engine which comprises, in combination, at least one cylinder, a cylinder head carried by said cylinder, a piston reciprocable in said cylinder, said cylinder head being provided with a hollow space of cylindrical shape in communication with said main combustion chamber, a cylindrical sleeve fitting slidably against the inner wall of said hollow space with a gastight fit, a cylindrical plunger piston fitting slidably against the inner wall of said sleeve with a gas-tight fit, means for varying the position of said plunger piston with respect to said cylinder head, and means interposed between said cylinder head and said sleeve for constantly reciprocating said sleeve in said cylinder head to keep a permanently sliding contact between said plunger piston and said sleeve, whereby said plunger piston is prevented from sticking in the position it occupies with respect to said cylinder head.

2. An engine according to claim 1 further including means for temporarily stopping the reciprocating movement of said sleeve.

3. An engine according to claim 1 in which said sleeve is provided with a slot so as to permit radial expansion thereof.

4. An engine according to claim 1 in which said sleeve reciprocating means are hydraulic means, further including abutment means carried by said cylinder head and said plunger piston respectively to limit the reciprocating movement of said sleeve in opposed directions, whereby the amplitude of reciprocation of said sleeve is automatically adjusted in accordance with the position of said plunger piston with respect to said cylinder head.

References Cited in the file of this patent

UNITED STATES PATENTS

| | | |
|---|---|---|
| 2,040,652 | Gaty | May 12, 1936 |
| 2,120,012 | Andreau | June 7, 1938 |
| 2,163,015 | Wagner | June 20, 1939 |
| 2,316,790 | Hickey | Apr. 20, 1943 |
| 2,367,894 | Shore | Jan. 23, 1945 |
| 2,420,117 | Weatherup | May 6, 1947 |
| 2,434,151 | Fisk | Jan. 6, 1948 |
| 2,500,409 | Hawkins | Mar. 14, 1950 |

FOREIGN PATENTS

| | | |
|---|---|---|
| 334,312 | Germany | Mar. 15, 1921 |
| 909,061 | France | Nov. 19, 1945 |

OTHER REFERENCES

Rainbow, German application Serial No. A22508, printed October 18, 1956 (Klasse 46F Gruppe 701).